Patented Jan. 16, 1951

2,538,105

UNITED STATES PATENT OFFICE 2,538,105

PREPARATION OF BROMOPHENACETIN

John C. Krantz, Jr., Ruxton, Md., assignor to The Emerson Drug Company of Baltimore City, Baltimore, Md., a corporation of Maryland No Drawing. Application June 29, 1948, Serial No. 35,991

3 Claims. (Cl. 260—562)

This invention relates to an improved method for the production of bromophenacetin (bromoethoxyacetanilide) whereby a pure product can be produced with excellent yield.

In the improved process of the present invention an alcoholic solution of the alkali salt of acetamidophenol (para-acetylaminophenol) is added gradually and with thorough agitation to a hot mixture of ethylene dibromide and alcohol, advantageously at the boiling point of the alcohol, and with continued heating and agitation to complete the reaction, with subsequent separation and purification of the bromophenacetin.

In carrying out the process an alcoholic solution of the alkali salt of the para-acetamidophenol is first prepared. A separate mixture of ethylene dibromide and alcohol is also separately prepared and is advantageously heated to a temperature approximating the boiling point of the alcohol before the alcoholic solution of the alkali salt of the acetamidophenol is added. A considerable excess of the ethylene dibromide, in excess of that required for reaction with the phenylate solution, is also advantageously used. It is also important to maintain effective stirring or agitation of the admixed ethylene dibromide and alcohol during the gradual addition of the alcoholic phenylate solution to avoid or minimize local over-concentration of phenylate. With thorough and effective agitation the gradually added phenylate is rapidly admixed with the alcoholic dibromide, containing an excess of dibromide. This appears to promote the formation of the desired bromophenacetin and to minimize formation of undesirable byproducts such as the ethylene ether of acetamidophenol by reaction of one molecule of ethylene dichloride with two molecules of the alkali salt of the acetamidophenol.

The alcoholic solution of the alkali salt of the acetamidophenol can be prepared by the use of aqueous alcohol, e. g., 95% ethyl alcohol, and by the use of caustic alkali, for example, by dissolving the para-acetamidophenol in 95% ethanol, separately dissolving the caustic alkali in 95% ethanol, and admixing the two alcoholic solutions with cooling. The amount of caustic alkali used should be sufficient to convert the acetamidophenol into the alkali salt.

Instead of using aqueous alcohol for forming the solution of the alkali phenylate, anhydrous alcohol is advantageously used, as by first forming a solution of sodium ethylate by adding metallic sodium to absolute alcohol to form an alcoholic solution of sodium ethylate and by adding the equivalent amount of acetamidophenol with warming to facilitate dissolution and formation of the alkali salt of the acetamidophenol by reaction of the acetamidophenol with the sodium ethylate.

The alcohol admixed with the ethylene dibromide may also be aqueous alcohol such as 95% ethanol, but anhydrous alcohol is advantageously used so that the reaction between the alkali salt of the acetamidophenol and the ethylene dibromide will take place in anhydrous alcohol solution.

In carrying out the process the mixture of ethylene dibromide and alcohol is first prepared and advantageously heated in a vessel provided with an agitator and with a reflux condenser. And provision is made for the gradual and progressive addition of the alcoholic solution of the acetamidophenylate and for regulation of the temperature. The vessel or still in which the reaction is carried out can be provided with suitable heating means such as a water jacket or bath for heating the apparatus at the outset of the process and with cooling coils or provision for circulating a cooling liquid through the jacket to aid in the control of the temperature. In a still provided with a reflux condenser the exothermic heat of reaction will tend to keep the reaction mixture at the boiling point of the alcohol and the refluxing and return of the alcohol will tend to offset to a greater or less extent the exothermic heat of reaction, which can be further regulated and controlled by suitable heating and cooling means such as heating or cooling coils and jackets.

The amount of alcohol used for forming the alkali solution of the acetamidophenylate and for admixture with the ethylene dibromide can be somewhat varied. The amounts and proportions illustrated by the following example have been found satisfactory for laboratory scale operation of the process, but they can be varied somewhat, e. g., plus or minus 10%, in small scale operation. In larger apparatus where considerable distillation and refluxing takes place which might tend to decrease the amount of alcohol remaining in the still, as that in the reflux condenser increases, somewhat larger amounts of alcohol can be used.

The acetamidophenol used should be a pure or purified product freed from objectionable impurities which might interfere with the process or result in the production of undesirable byproducts. I have found the following process an advantageous one for purifying an impure product by recrystallizing from water. The powdery, impure material was introduced gradually into water heated to the boiling point in the proportion of about 14.5 parts by weight of the impure product to 100 parts of water and the resulting solution was thoroughly stirred. Finely comminuted charcoal, such as "activated coal" was added equal to about 1% of the weight of the solution and the heating and stirring were continued for a short time. The still hot liquid was then rapidly filtered and prompt crystallization promoted by cooling and refrigeration of the vessel containing the solution. The product thus purified by recrystallization was found to be a satisfactory product for use in the process.

The process will be further illustrated by the following specific example, but it will be understood that the invention is not limited thereto.

A solution of sodium ethylate was prepared just prior to use by adding small pieces of sodium to absolute alcohol in the proportions of about 5 parts by weight of sodium to 118 parts by weight of absolute alcohol. The purified acetamidophenol was added to the resulting alcoholic solution of sodium ethylate, the amount of solution used being sufficient to convert the para-amidophenol into the sodium salt by reaction with the sodium ethylate. The liquid was warmed gently to facilitate dissolution and the formation of the alkali salt of the acetamidophenol.

A separate mixture or solution was made by adding alcohol to ethylene bromide in the proportions of 58 parts by weight of anhydrous alcohol to 188 parts by weight of the bromide. This mixture was formed in or added to the still in which the reaction was to be carried out. The amount of ethylene bromide used was three to four times the equivalent amount required for reacting with the acetamidophenylate to form the bromophenacetin.

The apparatus used was a vessel or still provided with a mechanical stirrer, a reflux condenser, an inlet for the phenylate solution, and heating means in the form of a water bath. The water bath was heated until the water was boiling actively and was maintained at this temperature. The contents of the still were heated to the maximum temperature possible with the water bath used and the deep purple-red solution of acetamidophenylate was added slowly to the ethylene bromide and alcohol mixture in the still, with thorough agitation. As the process progresses and more and more of the phenylate solution is added the amount of alcohol in the still increases and the heat of reaction causes active boiling which serves to bring about or increase agitation. Thorough agitation is important and continued mechanical agitation supplements the agitation caused by self-heating and boiling and also promotes the rapid dissemination of the added phenylate throughout the reaction mixture in the still and tends to avoid or minimize local overheating and undesirable reactions. After all of the phenylate solution has been added the contents of the still are further heated and boiling is continued, with continued refluxing, for a further period of time to insure completion of the reaction. In the laboratory a further heating of about one hour was found sufficient.

After the completion of the process the greater part of the alcohol was expelled by ordinary distillation and the remainder of the alcohol and the excess of ethylene bromide were then removed by steam distillation.

When the still is allowed to cool so that crystallization takes place, it is warmed until the crystals disappear. The resulting mixture of liquid and solid can be removed from the still to a separate receptacle, in which case the still should be rinsed with a small amount of hot alcohol and the resulting solution added to the mixture in the receptacle together with additional alcohol sufficient to form a solution of the desired product using, e. g., 95% alcohol. The resulting solution is heated to incipient ebullition, a small amount of powdered charcoal is introduced, e. g., 1% of the solution, and the liquid is passed through a suitable filter, which removes the sodium bromide and other solid or insoluble constituents. The filtrate containing the bromophenacetin is chilled with ice and the crystals that form are separated by filtration.

The crystals first formed may exhibit some discoloration and they can be further purified by dissolving them in the minimum quantity of hot alcohol, diluting this solution with an equal volume of boiling water, and chilling with ice to separate the crystals, in the manner above referred to. Repeated purification in this way gives crystals which are colorless and free from sodium bromide. A product so prepared began to melt rather consistently at 131° C. (uncorrected) when tested with the hotplate method of the Fisher Scientific Company.

I claim:

1. The method of producing bromophenacetin which comprises gradually adding an alcoholic solution of an alkali metal salt of acetamidophenol to a hot mixture of ethylene dibromide and alcohol, with effective agitation and with an excess of the dibromide, in excess of that required to react with the acetamidophenylate.

2. The method of producing bromophenacetin which comprises gradually and progressively adding an anhydrous ethyl alcohol solution of the sodium salt of acetamidophenol to a hot mixture of ethylene dibromide and alcohol, with effective agitation, and with the amount of ethylene dibromide in excess of that corresponding to the acetamidophenylate.

3. A method as in claim 1, in which the alkali metal is sodium.

JOHN C. KRANTZ, Jr.

REFERENCES CITED

The following references are of record in the file of this patent:

FOREIGN PATENTS

| Number | Country | Date |
|---|---|---|
| 85,983 | Germany | Mar. 5, 1896 |
| 280,225 | Germany | Nov. 6, 1914 |
| 388,187 | Germany | Jan. 10, 1924 |